UNITED STATES PATENT OFFICE.

JOHAN HJALMAR LIDHOLM, OF WARGÖN, SWEDEN.

METHOD OF PRODUCING CYANAMID FROM CALCIUM CYANAMID.

1,380,223.      Specification of Letters Patent.     Patented May 31, 1921.

No Drawing.      Application filed June 12, 1920. Serial No. 388,677.

*To all whom it may concern:*

Be it known that I, JOHAN HJALMAR LIDHOLM, a citizen of the Kingdom of Sweden, residing at Wargön, Sweden, have invented a new and useful Method of Producing Cyanamid from Calcium Cyanamid, of which the following is a specification.

It has already been proposed to produce cyanamid from calcium cyanamid by precipitating the lime by means of carbon dioxid according to the following reaction:

$$CaN_2C + CO_2 + H_2O = CaCO_3 + CN.NH_2$$

Said method has, however, hitherto not given the desired result on account of the tendency of the cyanamid to be converted into dicyandiamid:

$$2CN.NH_2 = C_2H_4N_4$$

When carbon dioxid is supplied to a mixture of calcium cyanamid and water a pure solution of cyanamid cannot, therefore, be obtained but only a solution which besides cyanamid contains a considerable percentage of dicyandiamid from which latter the cyanamid cannot be economically separated.

This invention relates to a method of producing cyanamid from technical calcium cyanamid by binding the lime by means of carbon dioxid in such manner that no or practically no dicyanamid is formed.

The invention consists, chiefly, in that the calcium cyanamid is gradually fed into water or an already prepared solution of cyanamid under a large supply of carbon dioxid, the result being that practically no conversion of cyanamid into dicyanamid takes place. The reason for this result by gradually supplying the calcium cyanamid into the solution seems to be that it enables the immediate precipitation of the lime which is dissolved, the result being that the solution is maintained neutral or only slightly alkaline. If, on the contrary, the calcium cyanamid is supplied to water in large quantities at one time and carbon dioxid then is supplied gradually for precipitating the lime the solution in such case will be strongly alkaline and as the essential reason for the polymerization of the cyanamid in solution is the presence of hydroxyl ions (alkali) it is easily understood why it has been impossible according to the methods hitherto used to convert calcium cyanamid quantitatively into cyanamid by precipitating with carbon dioxid.

By the present method it is possible to produce strong solutions of cyanamid, inasmuch as it is possible to supply crude calcium cyanamid into the solution until the mud of calcium carbonate and carbon formed during the operation prevents an effective supply of the carbon dioxid. The supply of calcium cyanamid can thus be continued until the quantity equals 50% by weight of the liquid used before the process needs be interrupted, and the cyanamid solution filtered off from the mud containing about 130 grams cyanamid with a percentage of 1 gram dicyandiamid only per liter. If a solution of cyanamid instead of water is used when starting the operation it is possible to produce still more concentrated solutions of cyanamid.

The carbon dioxid should preferably be supplied with a higher pressure than the atmospheric pressure and be intimately mixed with the solution for facilitating its absorption. The mixture of the carbon dioxid with the solution may be carried out by means of any well-known means for performing reactions between gases and liquids, for instance by means of spraying nozzles by which the carbon dioxid is blown into the solution in a finely divided state, pumps, beating and mixing apparatus, etc., or by spraying the mixture of calcium cyanamid and water in a finely divided state into an atmosphere of carbon dioxid.

The reaction is preferably performed at a temperature not exceeding 70° C. and the reaction heat may preferably be removed by cooling. The carbon dioxid can be used in pure state or as gases containing carbon dioxid, for instance combustion gases or lime furnace gases. The carbon dioxid which is not immediately absorbed by the solution may suitably be recovered and again supplied to the solution by means of a pumping device.

I claim:—

1. Method of producing cyanamid practically free from dicyandiamid, consisting in gradually supplying calcium cyanamid to a water solution and precipitating the calcium by means of carbon dioxid.

2. The method of producing cyanamid, which comprises gradually supplying calcium cyanamid to water while supplying thereto carbon dioxid sufficient to maintain a reduced alkalinity of the solution formed to prevent any substantial formation of dicyandiamid.

3. Method of producing cyanamid practically free from dicyandiamid, consisting in gradually supplying calcium cyanamid to a water solution and intimately mixing the solution with carbon dioxid so as to precipitate the calcium as the calcium cyanamid is dissolved.

4. Method of producing cyanamid practically free from dicyandiamid, consisting in gradually supplying calcium cyanamid to a water solution and simultaneously supplying carbon dioxid under pressure to the solution so as to precipitate the calcium as the calcium cyanamid is dissolved.

5. Method of producing cyanamid practically free from dicyandiamid, consisting in gradually supplying calcium cyanamid to a water solution of said salt and simultaneously, precipitating calcium by means of carbon dioxid and cooling the reacting mixture.

In testimony whereof I have signed my name.

JOHAN HJALMAR LIDHOLM.